United States Patent [19]

Fenner

[11] Patent Number: 4,630,982
[45] Date of Patent: Dec. 23, 1986

[54] CARGO TIE-DOWN SYSTEM

[75] Inventor: James A. Fenner, Renton, Wash.

[73] Assignee: The Boeing Company, Seattle, Wash.

[21] Appl. No.: 802,868

[22] Filed: Nov. 27, 1985

[51] Int. Cl.[4] ................ B61D 45/00; F16B 37/00; F16B 39/00

[52] U.S. Cl. ...................... 410/102; 410/105; 24/265 CD; 24/701; 248/499; 403/353; 403/381; 411/85; 411/400; 411/432

[58] Field of Search ............ 24/115 K, 265 CD, 686, 24/701; 248/499, 503.1; 403/353, 381; 410/96, 101, 102, 104, 105, 106, 108, 115, 116; 411/14, 84, 85, 103, 107, 310, 311, 397, 400, 427, 432, 435

[56] References Cited

U.S. PATENT DOCUMENTS

| | | | |
|---|---|---|---|
| 1,200,474 | 10/1916 | Dunlap | 411/400 X |
| 2,078,591 | 4/1937 | Sprague | 24/265 CD |
| 3,145,005 | 8/1964 | Wester | 411/435 X |
| 3,212,457 | 10/1965 | Looker | 410/105 |
| 3,367,000 | 2/1968 | Schluter | 24/221 |
| 3,381,925 | 5/1968 | Higuchi | 410/116 |
| 4,064,811 | 12/1977 | Copeland | 410/102 |
| 4,185,799 | 1/1980 | Richards, Jr. | 410/105 X |
| 4,230,432 | 10/1980 | Howell | 410/102 |
| 4,295,765 | 10/1981 | Burke | 410/101 |
| 4,381,163 | 4/1983 | Witte et al. | 411/311 |
| 4,400,856 | 8/1983 | Tseng | 410/116 X |
| 4,431,352 | 2/1984 | Andrews | 410/101 |
| 4,531,774 | 7/1985 | Whatley | 410/101 X |

Primary Examiner—Robert B. Reeves
Assistant Examiner—David F. Hubbuch
Attorney, Agent, or Firm—Joan H. Pauly

[57] ABSTRACT

A receptacle (10) is incorporated into the floor (2) of an aircraft cargo compartment. Receptacle (10) has a socket (12) that receives a head (30) of a stud (24). Shaft (26) of stud (24) extends through panel (6). Nut (70) is threadedly tightened onto shaft (26) to secure panel (6) thereto. Nut (70) has a socket (80) isolated from threaded hole (72) that engages shaft (26). Socket (80) is substantially identical to socket (12). A second stud (48) is engaged in socket (80) and in turn engages cargo restraining means.

10 Claims, 20 Drawing Figures

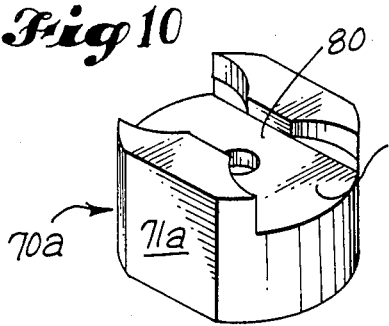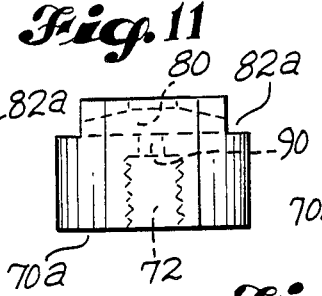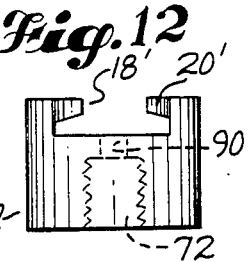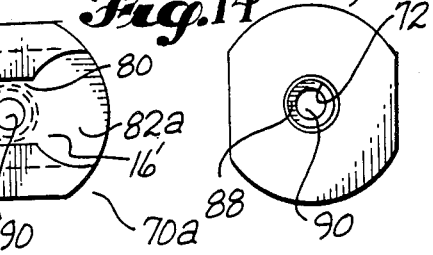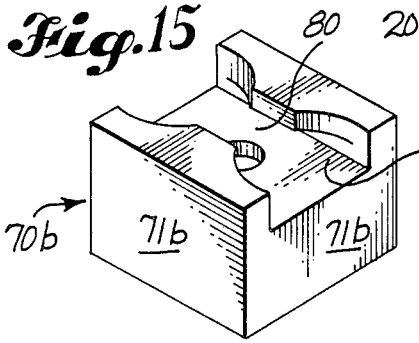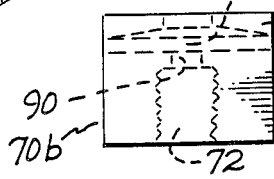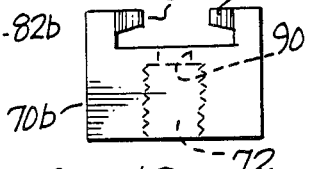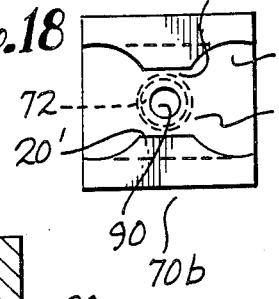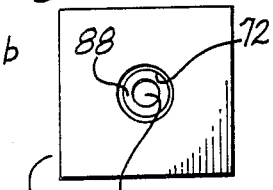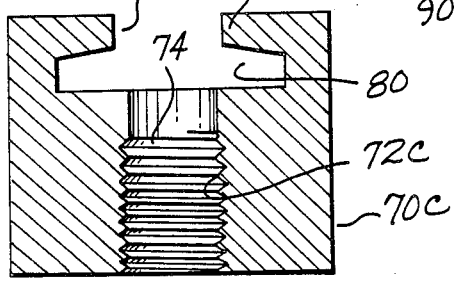

CARGO TIE-DOWN SYSTEM

DESCRIPTION

1. Technical Field

This invention relates to methods and apparatus for fastening devices to tie-down receptacles in aircraft cargo compartments and, more particularly, to such a method and apparatus that incorporates a tie-down nut with an integral receptacle so that more than one device may be releasably secured to a single receptacle.

2. Background Art

Aircraft cargo compartments are conventionally provided with nets and straps for stabilizing items of cargo that may shift during flight. These nets and straps include standard hardware for engaging tie-down receptacles permanently mounted in the floor, ceiling, and sidewalls of the compartment. In many known systems, the receptacles are provided in a continuous line along a track permanently mounted to the floor or other surface of the compartment. A serious disadvantage of this arrangement is that the tracks are fairly heavy and, thus, add a significant amount of weight to the aircraft. One way of reducing the weight penalty of the tie-down receptacles is to provide a plurality of discrete receptacles at strategic locations instead of a continuous track of receptacles. This solution to the weight problem creates a new problem when it is desired to secure items such as cargo conveyor apparatus or panels within the cargo compartment. The conventional method of securing such an item is to secure it to a plurality of the tie-down receptacles by means of studs that engage the receptacles and the item and ordinary nuts that tighten against the item to hold it in place. With this arrangement, the receptacles to which the item is attached are no longer available for receiving the hardware of nets and straps to stabilize cargo items.

U.S. Pat. No. 2,078,591, granted Apr. 27, 1937, to C. E. Sprague; and No. 3,367,000, granted Feb. 6, 1968, to F. M. Schluter, each disclose a fastening device that includes a socket that is mounted to a structure and releasably receives a pin having a loop for engaging a strap. The socket and pin arrangement disclosed by Sprague is incorporated into a rifle, and the device disclosed by Schluter is intended for use in aircraft or other vehicles to restrain cargo. U.S. Pat. No. 4,064,811, granted Dec. 27, 1977, to D. R. Copeland, discloses a quick disconnect anchor for use on boats, which anchor is a modified form of the receptacles commonly used in aircraft cargo compartments and receives a pin and locking foot member of conventional type. U.S. Pat. No. 4,185,799, granted Jan. 29, 1980, to E. W. Richards, Jr.; and No. 4,230,432, granted Oct. 28, 1980, to R. B. Howell, each disclose a relatively complicated anchor/-fitting assembly for attaching devices to standard track receptacles in aircraft. U.S. Pat. No. 4,295,765, granted Oct. 20, 1981, to M. R. Burke, discloses apparatus for tying down cargo in the bed of a truck, which apparatus includes a body, plug, and nut assembly that forms a receptacle with a threaded socket for receiving the shaft of an eyebolt. U.S. Pat. No. 4,400,856, granted Aug. 30, 1983, to T. S. Tseng, discloses a receptacle and cap fitting intended to replace the conventional form of receptacle and hold-down fitting used in aircraft cargo compartments. A fastening device that transfers a load from a swivel eye to a base is disclosed in U.S. Pat. No. 4,431,352, granted Feb. 14, 1984, to G. E. Andrews.

The conventional systems and patents described above, together with the prior art cited in the patents, should be carefully considered for the purpose of putting the present invention into proper perspective relative to the prior art.

DISCLOSURE OF THE INVENTION

A subject of the invention is apparatus for releasably securing two or more devices to a structure at a single location. According to an aspect of the invention, the apparatus comprises the combination of a receptacle, a stud, retaining means, a nut, and a second stud. The receptacle is mounted on the structure and has a first socket. The first stud has a threaded shaft portion for engaging a first device, and a head portion dimensioned to be received into the first socket with the shaft portion projecting from the socket. The retaining means releasably secures the head portion in the socket. The nut has a hole and a second socket. The hole has threads for threadedly engaging the shaft portion of the first stud to secure the first device thereto. The second socket is substantially the same as the first socket to enable it to receive substantially any stud that is receivable by the first socket. The second stud has a head portion dimensioned to be received into the second socket and means for engaging a second device.

A preferred feature of the invention is the spacing of the threads of the hole from the second socket to prevent the shaft portion of the stud from intruding into the second socket and thereby interfering with insertion of a head portion of a second stud into the second socket. Another preferred feature is a nut that includes blocking means between the hole and the second socket to prevent the shaft portion from so intruding into the second socket.

Still another preferred feature is providing the nut with an inspection opening communicating with the hole to allow an operator to visually confirm that the shaft portion is securely engaged in the hole. This inspection opening may be provided in a number of forms. In a preferred embodiment which includes the blocking means described above, the blocking means includes a wall portion of the nut located between the second socket and the hole, and the inspection opening is formed by a passageway extending through this wall portion from the second socket to the hole. This arrangement has the advantages of being relatively simple and of maximizing the ease of visual inspection.

The sockets of the apparatus and the manner in which they engage the studs may also vary considerably. However, in the preferred embodiments, each of the receptacle and the nut has an upwardly facing recess for receiving a head portion of a stud, and each socket has a laterally directed opening communicating with the respective recess for allowing the head portion to be slid laterally into the socket from the recess. Each socket also has a slot to provide clearance for a shaft portion of the stud, and rim portions adjacent to the slot for preventing upward movement of the head portion out from the socket. The retaining means releasably secures the head portion against lateral movement out from the socket.

Another subject of the invention is a method of releasably securing two or more devices to a structue at the location of a socket, in a system in which a receptacle having such socket is mounted on the structure. According to an aspect of the invention, the method comprises positioning a stud with a head portion thereof received into the socket and a threaded shaft portion thereof projecting out from the socket. The head portion is releasably secured in the socket. A first device is placed onto the shaft portion. A nut is provided which has a threaded hole and a second socket substantially the same as the first socket. The shaft portion of the stud is threaded into the hole to attach the nut to the shaft portion and to secure the first device in an attached position. A head portion of a second stud is secured in the second socket, and a second device is secured to the second stud. Preferably, the shaft portion is prevented from intruding into the second socket to prevent it from interfering with the positioning of the second stud.

The method and apparatus of the invention provide an efficient and effective solution to the problems discussed above relating to the unavailability of receptacles for tying down nets and straps in conventional systems when items such as cargo conveyor apparatus and panels have been tied down to such receptacles. The method and apparatus of the invention make it possible to preserve the capacity of the receptacles mounted in aircraft cargo compartments to receive a full range of standard hardware for fastening down cargo and, at the same time, use such receptacles to secure items such as cargo conveyor apparatus and panels. The apparatus of the invention is relatively simple in construction and inexpensive to manufacture and maintain and is designed to minimize the amount of weight added to the aircraft. The method of the invention is easy to carry out and does not require any special skill on the part of the operators. Both the method and the apparatus are very versatile and may be used in connection with a variety of types of cargo hold-down systems to increase the capacity of such systems.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 5 is an enlarged view of a portion of the threaded hole in the nut shown in FIG. 4.

FIG. 10 is a pictorial view of another preferred embodiment of the nut.

FIG. 11 is an elevational view of the nut shown in FIG. 10 taken facing a flat side face of the nut.

FIG. 12 is an elevational view of the nut shown in FIGS. 10 and 11 taken facing a curved side of the nut.

FIG. 13 is a top plan view of the nut shown in FIGS. 10-12.

FIG. 14 is a bottom plan view of the nut shown in FIGS. 10-13.

FIG. 15 is a pictorial view of still another preferred embodiment of the nut.

FIG. 16 is a side elevational view of the nut shown in FIG. 15.

FIG. 17 is like FIG. 16 except that it shows a face of the nut perpendicular to the face shown in FIG. 16.

FIG. 18 is a top plan view of the nut shown in FIGS. 15-17.

FIG. 19 is a bottom plan view of the nut shown in FIGS. 15-18.

FIG. 20 is a sectional view of a modified form of any one of the three embodiments of the nut shown in FIGS. 1-20.

BEST MODES FOR CARRYING OUT THE INVENTION

Figure 1:
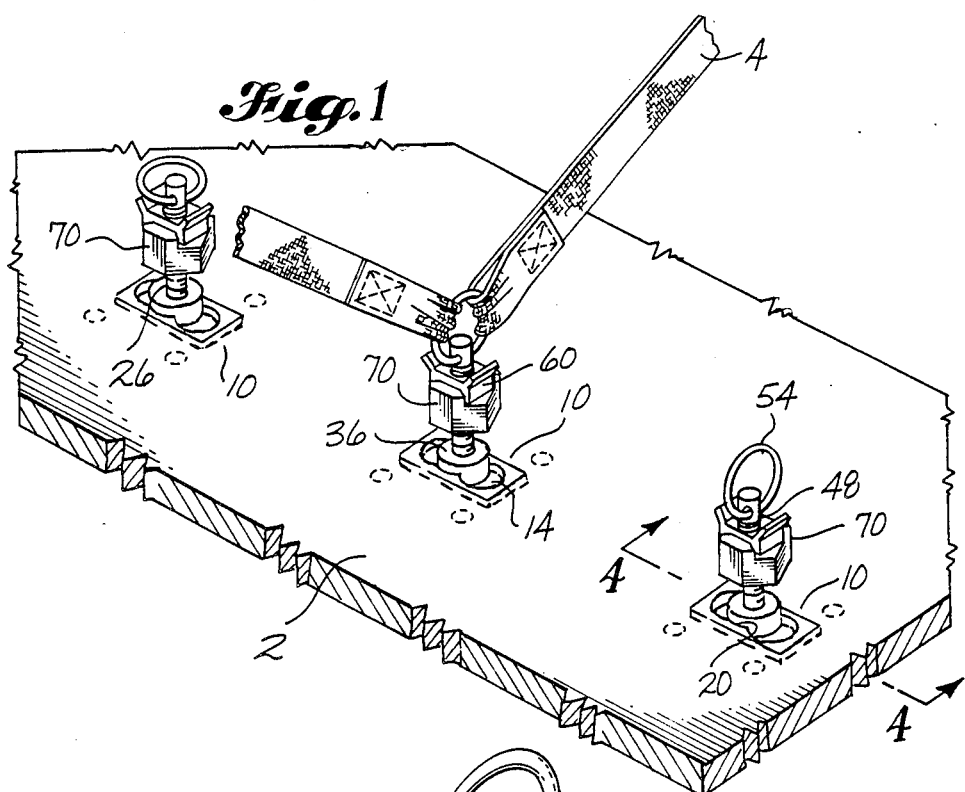
FIG. 1 is a pictorial view of a preferred embodiment of the apparatus of the invention incorporated into an aircraft cargo compartment.
Figure 2:
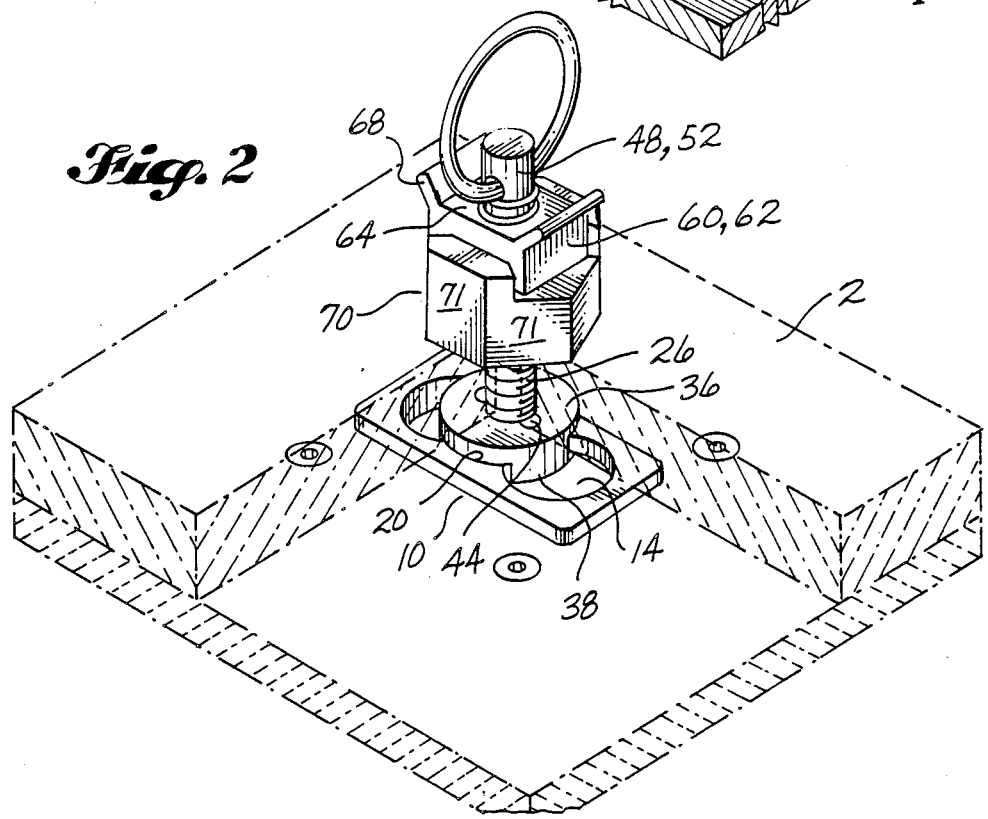
FIG. 2 is an enlarged pictorial view of one of the receptacles and associated fastening apparatus shown in FIG. 1, with portions of the cargo compartment floor cut away.
Figure 3:
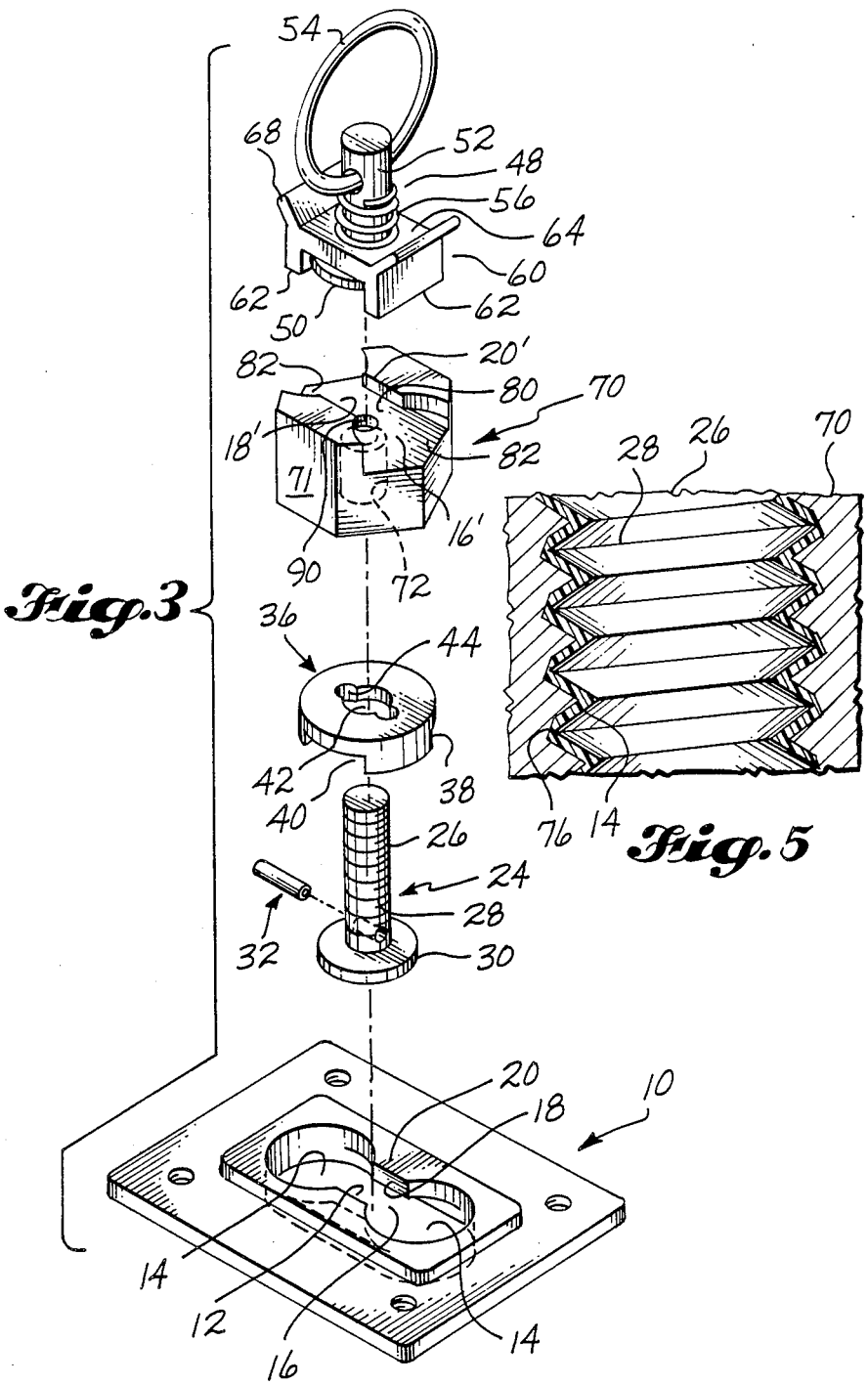
FIG. 3 is an exploded pictorial view of the receptacle and fastening apparatus shown in FIG. 2.
Figure 4:
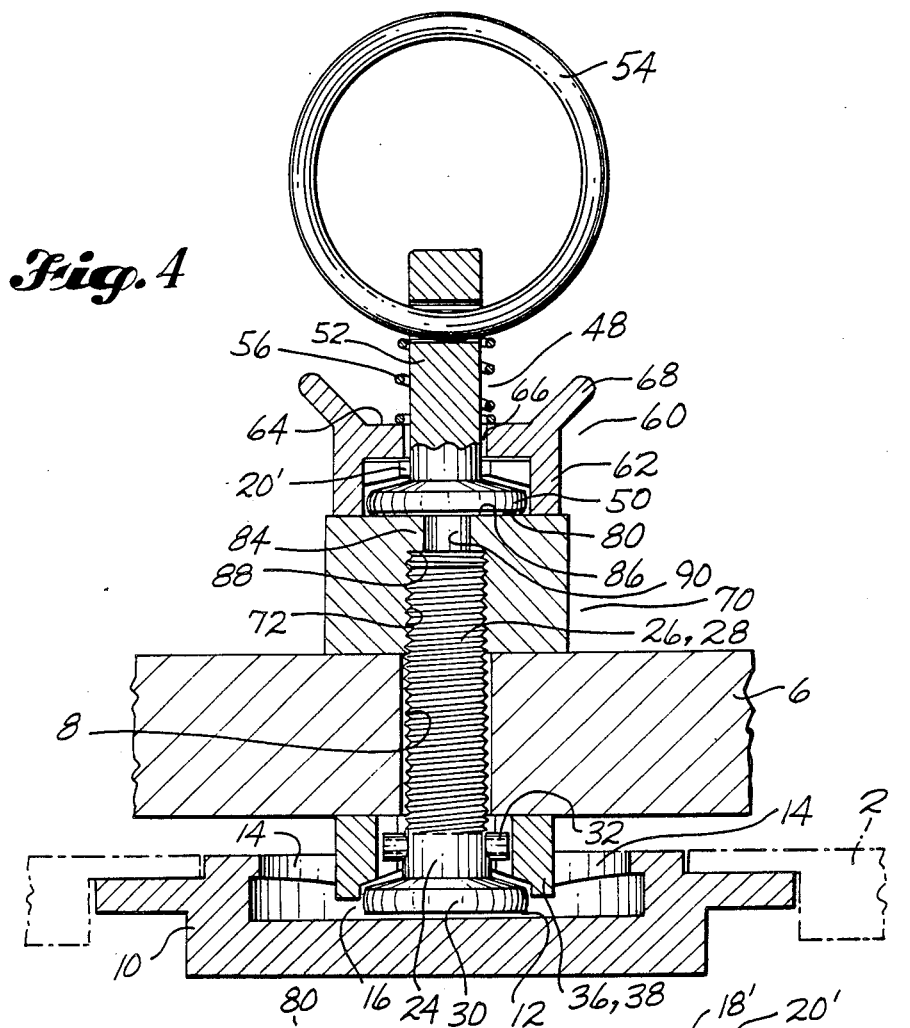
FIG. 4 is a sectional view taken along the line 4—4 in FIG. 1.
Figure 6:
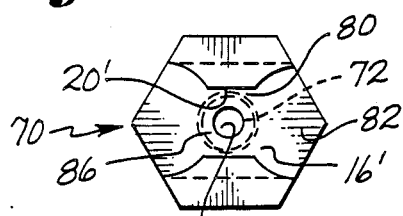
FIG. 6 is an elevational view of the nut shown in FIGS. 1-4, taken facing one of the flat sides of the nut.
Figure 7:
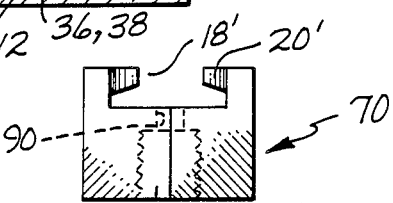
FIG. 7 is like FIG. 6 except that the view is taken facing the interface between two flat sides of the nut.
Figure 8:
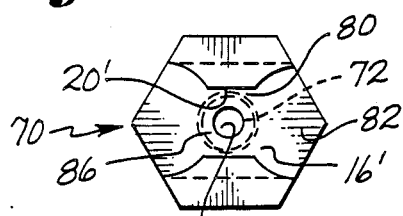
FIG. 8 is a top plan view of the nut shown in FIGS. 6 and 7.
Figure 9:
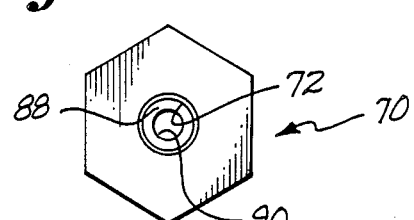
FIG. 9 is a bottom plan view of the nut shown in FIGS. 6-8.

The drawings show apparatus that is constructed according to the invention and that also constitutes the best modes of the apparatus of the invention currently known to the applicant. The drawings also illustate the best mode for carrying out the method of the invention currently known to the applicant. FIGS. 1, 2, and 4 illustrate the apparatus of the invention in association with a floor structure and fastening apparatus of a type used in aircraft cargo compartments. (It should be noted that in FIG. 1 the discrete receptacles 10 are shown closer together than normally would be necessary to provide the required cargo restraint capacity or desirable to maximize the reduction in weight of the overall tie-down system.) It is anticipated that the primary use for the method and apparatus of the invention will be in aircraft cargo tie-down systems of the type shown in the drawings. However, it is of course to be understood that the method and apparatus of the invention may also be used to advantage in connection with other types of structures and other types of tie-down systems.

In the system shown in FIGS. 1, 2, and 4, a plurality of receptacles 10 of a known type are permanently mounted in the floor 2 of a cargo compartment. The receptacles 10 are recessed into the floor 2 so that their upper faces will be flush with the floor 2. FIG. 4 shows a stud 24 and retainer 36 of known types and a preferred embodiment of the nut 70 of the invention being used to secure a panel 6 to one of the receptacles 10. The panel 6 is omitted from FIGS. 1 and 2 in order to more clearly illustrate the apparatus of the invention. Each of FIGS. 1, 2, and 4 also shows a second stud 48 releasably engaged in the socket 80 of each of the nuts 70 by means of a retainer 60. The stud 48 and retainer 60 are of conventional types used for securing cargo restraint straps 4, as shown in FIG. 1.

The apparatus of the invention comprises a combination of features including a novel nut, such as the nut 70 shown in FIGS. 1-9, a number of other elements some or all of which may be of known types, and the manner in which the nut and such other elements cooperate with each other to produce the desired result of securing two or more devices to a structure at a single location. The method of the invention comprises the steps of manipulating the nut and the other elements to produce such result. The known receptacle 10, studs 24,48, and retainers 36,60 are shown and described in detail herein for the purpose of illustrating a typical example of such other elements. It is of course to be understood that other types of receptacles, studs, and retainers may also be used, and the nut may be varied accordingly, without departing from the spirit and scope of the invention as set forth in the claims.

Referring to FIGS. 1-4, each receptacle 10 includes a socket 12 into which the head 30 of the stud 24 is received. Each receptacle 10 also includes two upwardly facing recesses 14, one on each side of the socket 12. The socket 12 has a laterally directed opening 16 on each side communicating with the respective recess 14 for allowing the head 30 of the stud 24 to be slid laterally into the socket 12 from the recess 14. The socket 12 also has a slot 18 extending between the recesses 14 and opening onto the upper surface of the receptacle 10 to provide clearance for the shaft 26 of the stud 24 when the head 30 is slid into the socket 12 and to allow the shaft 26 to project upwardly and outwardly from the socket 12 when the head 30 is positioned in the socket 12. The socket 12 also includes two rim portions or flanges 20 that extend radially inwardly above the socket 12 and have inner ends that are adjacent to and define the slot 18. The upper surfaces of the flanges 20 are integral continuations of the upper surface of the receptacle 10 so that they will be flush with the floor surface 2. The flanges 20 prevent upward movement of the head 30 of the stud 24 out from the socket 12. The separate retainer 36 releasably secures the head 30 against lateral movement out from the socket 12 into the recesses 14.

The stud 24 that engages the socket 12 and the receptacle 10 has basically the form of a simple threaded bolt. See FIGS. 3 and 4. The head 30 is flat and is dimensioned to be received into the socket 12 with the shaft 26 projecting from the socket 12 and to engage the flanges 20 to prevent unwanted upward movement of the stud 24. The shaft 26 has threads 28 for threadedly engaging the nut of the invention and other types of nuts. A pin 32 extends radially through a hole in the shaft 26 to prevent rotation of the stud 24, as is described in more detail below. The spacing between the pin 32 and head 30 is dimensioned to be just sufficient to provide clearance for the flanges 20 between the pin 32 and head 30.

The retainer 36 that prevents the stud 24 from moving laterally out from the socket 12 has a generally round disk-shaped configuration. The top surface of retainer 36 is flat, and the bottom and side surfaces are provided with two diametrically opposed recesses 40 for accommodating the flanges 20. The sides and bottom of the retainer 36 between the recesses 40 form downwardly depending feet 38 that straddle the socket 12 when the retainer is in its use position shown in FIGS. 1, 2, and 4. In such position, the downwardly facing walls that define the tops of the recesses 40 engage the top surfaces of the flanges 20. The retainer 36 has a center axial hole 42 extending therethrough for slidingly receiving the shaft 26 of the stud 24. A radially extending slot 44 extends across the top of retainer 36 and intersects the axial hole 42 to receive the pin 32 carried by the shaft 26. Engagement of the pin 32 in the ends of slot 44 prevents rotation of stud 24.

As shown in FIG. 4, a panel 6 is secured to the receptacle 10 by engaging the shaft 26 in a suitable hole 8 in the panel 6. The hole 8 may be dimensioned to receive the shaft 26 with a small amount of clearance so that panel 6 rests on top of retainer 36, as shown in FIG. 4. Alternatively, the hole 8 may be larger to receive the top of retainer 36 so that panel 6 rests on top of receptacle 10 and floor 2. In either case, the shaft 26 is dimensioned to extend through the panel 6 and project upwardly and outwardly therefrom. Nut 70 is threaded onto shaft 26 and tightened against panel 6 to secure panel 6 in its attached position. This also tightens retainer 36 downwardly against the top surface of receptacle 10 to prevent upward movement of retainer 36 and firmly position it in its retaining position shown in FIGS. 1, 2, and 4. In conventional installations, an ordinary nut is used instead of the nut 70 of the invention to secure panel 6 and retainer 36.

The nut 70 has a hexagonal shape with six flat side faces 71. A threaded axial hole 72 extends into nut 70 for threadedly engaging the shaft 26 of stud 24 to secure the panel 6 or other device to the stud 24 and thereby secure it to the receptacle 10. The nut 70 also has formed thereon a socket 80 which is substantially the same as the socket 12 formed by the receptacle 10. This enables the socket 80 to receive substantially any stud that is receivable by the socket 12. This in turn preserves the capacity of the system to secure a strap or other device at the location of the receptacle 10 even though the panel 6 is already secured thereto.

The socket 80 is axially aligned with the hole 72 and faces upwardly in the same orientation as the socket 12 of the receptacle 10. The hole 72 opens onto the bottom surface of the nut 70, and the socket 80 opens onto the upper surface of the nut 70. Socket 80 has lateral openings 16', a slot 18' for shaft clearance, and flanges 20' that are essentially identical to the openings 16, slot 18, and flanges 20 of the socket 12 of the receptacle 10. The nut 70 also has a recess 82 on each side of the socket 80. The recesses 82 perform the same function and are substantially the same as the recesses 14 of the receptacle 10. The major difference between the recesses 14,82 is that the recesses 14 are closed at their laterally outer ends because the receptacle 10 is embedded in the floor 2 of the compartment, whereas the recesses 82 are open on their laterally outer ends and therefore may be smaller than the recesses 14 and still easily receive the head 30 of the stud 24.

The nut 70 preferably includes blocking means between the hole 72 and the socket 80 to prevent the shaft 26 of the stud 24 from intruding into the socket 80 and thereby interfering with insertion of a head of another stud into the socket 80. In the preferred embodiment of the nut 70 shown in FIGS. 1-9, and also in the preferred embodiments shown in FIGS. 10-14 and 15-19, the blocking means takes the form of a wall portion 84 of the nut 70,70a,70b located between the socket 80 and hole 72. The upper surface 86 of the wall portion 84 forms a portion of the base surface of the socket 80, and the lower surface of the wall portion 84 forms a downwardly facing shoulder 88. This shoulder 88 defines the top of the hole 72 and abuts the inner end of a shaft 26 that is threaded all the way into the hole 72 to make it impossible for the shaft 26 to be threaded too far into the nut 70,70a,70b. Preferably, the shaft 26 is dimensioned to have a length that is just sufficient to engage the panel 6 and securely engage the hole 72. If the shaft 26 should be too long, washers of a conventional form may be provided between nut 70,70a,70b and panel 6 to accommodate the extra length of the shaft 26 and securely position the panel 6 in its attached position.

The nut of the invention is also preferably provided with an inspection opening communicating with the hole 72 to allow an operator to visually confirm that the shaft 26 is securely engaged in the hole 72; i.e., that the axial extent of threaded engagement between hole 72 and shaft 26 is sufficient to provide a secure connection. In the preferred embodiments, the inspection opening 90 is provided in the form of a passageway 90 extending through the wall portion 84 from the socket 80 to the hole 72. Passageway 90 is axially aligned with hole 72 and socket 80 to provide quick and easy visual inspection.

Referring to FIG. 20, in a modification of the nuts 70,70a,70b shown in FIGS. 1–19, the hole 72c extends axially all the way through the nut 70c from its bottom surface to the socket 80 and communicates directly with socket 80. This arrangement has the advantage of being relatively easy and inexpensive to manufacture. The upper portion of hole 72c does not have any threads. This spacing of the upper end of the threads of the hole 72c from the socket 80 prevents the shaft 26 from being threaded too far into the hole 72c and entering the socket 80, to in turn prevent the shaft 26 from interfering with insertion of a head of a stud into the socket 80. In this embodiment, the upper portion of hole 72c serves as the inspection opening discussed above.

In both embodiments of the hole 72,72c, it is preferable that the threads 74 be provided with means for making them self-locking. This prevents unwanted loosening of the nut 70 with respect to shaft 26 to maintain panel 6 and any devices attached to nut 70 securely in position. FIG. 5 illustrates one of the various known means by which the threads 74 may be made self-locking. The female threads 74 of hole 72 shown in FIG. 5 are of the type manufactured by Detroit Tool Industries under the trademark "Spiralock". The threads 74 have a 30° wedge ramp 76 at their root portion. Under a clamp load, the crests of the male threads 28 of the shaft 26 are wedged tightly against the ramp 76 to prevent lateral movement of shaft 26 which could cause loosening of the engagement between shaft 26 and hole 72.

As noted above, socket 80 is substantially the same as socket 12 in order to preserve the capacity of receptacle 10 to receive any of a variety of conventional stud fittings. A typical example of such a stud fitting is shown in FIGS. 1–4. The stud 48 of such fitting 48,54,60 has a head 50 that is essentially identical to the head 30 of the stud 24. The stud 48 also has an unthreaded shaft 52 that has a radial hole therethrough for receiving a ring 54. The ring 54 is permanently attached to the shaft 52 and is dimensioned to engage cargo restraint straps, such as straps 4 shown in FIG. 1. The fitting 48,54,60 also includes a retainer 60 for securing the head 50 against lateral movement out from a socket 12,80 into which it has been positioned. The retainer 60 has a horizontal web 64 and two opposite feet 62 that extend downwardly from the opposite ends of web 64. When the retainer 60 is in its retaining position, shown in FIGS. 1, 2, and 4, the feet 62 straddle the socket 80 and extend downwardly into the adjacent recesses 82. The bottom surface of the web 64 engages the upper surfaces of the flanges 20′. The retainer 60 has an axial hole 66 extending therethrough. As shown in FIGS. 1, 2, and 4, the shaft 52 of stud 48 projects upwardly and outwardly from the socket 80 and through this hole 66. A spring 56 surrounds shaft 52 and abuts ring 54 and a top surface of web 64 to urge retainer 60 downwardly into firm engagement with the top surfaces of flanges 20′. Spring 56 and retainer 60 are permanently mounted on stud 48. A wing 68 extends upwardly and outwardly from the junction of web 64 and each foot 62 to provide gripping means for moving retainer 60 upwardly along shaft 52 against the force of spring 56. This facilitates engagement and disengagement of stud 48 and retainer 60 with a receptacle 10 or nut 70.

FIGS. 10–14 show another preferrred embodiment of the nut 70a. This nut 70a is identical in function to the nut 70 shown in FIGS. 1–9 but has a different overall shape which results in a different shape of the recesses 82a on either side of the socket 80. The nut 70a has a generally round configuration about its circumference with two diametrically opposed flat faces 71a that provide gripping surfaces for ordinary hand tools for tightening the nut 70a.

FIGS. 15–19 illustrate still another preferred embodiment of the nut 70b which is identical in function to the nuts 70,70a shown in FIGS. 1–9 and 10–14, but which has an overall square configuration rather than a hexagonal or round with flats configuration. The nut 70b has four flat faces 71b to permit the nut to be engaged by an ordinary tool. The recesses 82b of nut 70b have a different configuration from the recesses 82,82a of nuts 70,70a because of the difference in overall configuration.

The carrying out of the method of the invention and the operation of the apparatus thereof is as follows.

The head 30 of stud 24 is positioned in socket 12 of receptacle 10 by moving head 30 downwardly into one of the recesses 14 and then sliding head 30 laterally into socket 12. As head 30 slides into socket 12, shaft 26 slides into slot 18. When head 30 is positioned in socket 12, shaft 26 projects upwardly and outwardly from socket 12, as shown in FIGS. 1, 2, and 4. Retainer 36 is placed onto projecting shaft 26, with shaft 26 extending into and through hole 42 in retainer 36. Retainer 36 is slid downwardly on shaft 26 until the tops of recesses 40 in retainer 36 engage the tops of flanges 20 and feet 38 enter receptacle recesses 14 to straddle socket 12. With retainer 36 in this position, head 30 is prevented from sliding laterally out of socket 12 by feet 38. As discussed above, the engagement of pin 32 in slot 44 of retainer 36 prevents rotation of stud 24.

With stud 24 and retainer 36 in position, panel 6 is placed onto shaft 26 by introducing shaft 26 into hole 8 in panel 6 and sliding panel 6 downwardly over shaft 26. Then the nut 70,70a,70b,70c is threaded onto shaft 26 to attach it to shaft 26 and secure panel 6 in its attached position. Nut 70,70a,70b,70c may be tightened with an ordinary wrench.

With stud 24, retainer 36, and panel 6 secured by nut 70,70a,70b,70c, the head 50 of stud 48 is positioned in socket 80 of nut 70,70a,70b,70c in the same manner that head 30 of stud 24 was positioned in socket 12 of receptacle 10. Before the positioning of head 50 is carried out, retainer 60 is slid upwardly along shaft 52 to prevent it from interferring from the positioning of head 50. Retainer 60 is moved upwardly and held in an upward position by an operator by positioning the thumb on the top of shaft 52 and pushing downwardly thereon and engaging each of the wings 68 with a finger of the same hand and pulling upwardly thereon. When thead 50 has been positioned, retainer 60 is released from the grip of the operator to allow the spring 56 to move the feet 62 into their socket-straddling position shown in FIGS. 1, 2, and 4. A cargo restraining device is attached to ring 54. FIG. 1 illustrates one such cargo restraining device in the form of two straps 4. The attaching of straps 4 to ring 54 is preferably carried out during assembly of the cargo restraining system, with straps 4 being permanently attached to ring 54. This arrangement helps to insure the security of the attachment between straps 4 and ring 54, prevents inadvertent misplacing of fitting 48,54,60, and also insures that fitting 48,54,60 is always readily available and accessible for attaching straps 4 to a nut 70 or receptacle 10.

The fitting 48,54,60, the nut 70, and the stud 24 and retainer 36 may easily be removed from the receptacle 10 to release the cargo being restrained and/or the panel 6 or to change the configuration of the restraining apparatus. The removal of the restraining apparatus is accomplished by reversing the engaging steps described in detail above.

Throughout the description of the method and apparatus of the invention, the terms "upwardly", "downwardly", "upper", and the like have been used. These terms have been used for the purposes of simplifying the description and illustrating a typical use attitude of the apparatus of the invention. The use of these terms is not intended to in any way limit the scope of the invention. It is intended to be understood that the apparatus of the invention may be used in a variety of use attitudes other than the attitude shown in the drawings. For example, the receptacle 10 might be mounted in and flush with a vertical wall or a ceiling structure.

It will be obvious to those skilled in the art to which this invention is addressed that the invention may be used to advantage in a variety of situations. Therefore it is also to be understood by those skilled in the art that various modifications and omissions in form and detail may be made without departing from the spirit and scope of the invention as defined by the following claims.

What is claimed is:

1. Apparatus for releasably securing two or more devices to a structure at a single location, said apparatus comprising the combination of:
   a receptacle mounted on the structure and having a first socket;
   a stud having a threaded shaft portion for engaging a first device, and a head portion dimensioned to be received into the socket with said shaft portion projecting from the socket;
   retaining means for releasably securing said head portion in the socket;
   a nut having a hole with threads for threadedly engaging said shaft portion to secure said first device thereto, and a second socket that is substantially the same as the first socket to enable it to receive substantially any stud that is receivable by the first socket; and
   a second stud having a head portion dimensioned to be received into the second socket, and means for engaging a second device.

2. Apparatus as described in claim 1, in which the threads of said hole are spaced from the second socket to prevent said shaft portion from intruding into the second socket and thereby interfering with insertion of said head portion of said second stud into the second socket.

3. Apparatus as described in claim 2, in which the nut has an inspection opening communicating with said hole to allow an operator to visually confirm that said shaft portion is securely engaged in said hole.

4. Apparatus as described in claim 1, in which the nut includes blocking means between said hole and the second socket to prevent said shaft portion from intruding into the second socket and thereby interfering with insertion of said head portion of said second stud into the second socket.

5. Apparatus as described in claim 4, in which the nut has an inspection opening communicating with said hole to allow an operator to visually confirm that said shaft portion is securely engaged in said hole.

6. Apparatus as described in claim 5, in which the blocking means includes a wall portion of the nut located between said second socket and said hole, and the inspection opening is formed by a passageway extending through said wall portion from said second socket to said hole.

7. Apparatus as described in claim 1, in which the nut has an inspection opening communicating with said hole to allow an operator to visually confirm that said shaft portion is securely engaged in said hole.

8. Apparatus as described in claim 1, in which each of said receptacle and said nut has an upwardly facing recess for receiving a head portion of a stud; each socket has a laterally directed opening communicating with the respective recess for allowing the head portion to be slid laterally into the socket from the recess, a slot to provide clearance for a shaft portion of the stud, and rim portions adjacent to the slot for preventing upward movement of the head portion out from the socket; and the retaining means releasably secures the head portion against lateral movement out from the socket.

9. In a system in which a receptacle having a first socket is mounted on a structure, a method of releasably securing two or more devices to the structure at the location of the socket, comprising:
   positioning a stud with a head portion thereof received into the socket and a threaded shaft portion thereof projecting out from the socket;
   releasably securing said head portion in the socket;
   placing a first device onto said shaft portion;
   providing a nut having a threaded hole and a second socket substantially the same as the first socket;
   threading said shaft portion into said hole to attach the nut to said shaft portion and to secure said first device in an attached position;
   securing a head portion of a second stud in the second socket; and
   securing a second device to said second stud.

10. A method as described in claim 9, comprising preventing said shaft portion from intruding into the second socket to prevent it from interfering with the positioning of the second stud.

* * * * *